(12) United States Patent
Yen et al.

(10) Patent No.: US 7,576,784 B2
(45) Date of Patent: Aug. 18, 2009

(54) APPARATUS FOR ACQUIRING IMAGE AND METHOD THEREFOR

(75) Inventors: Chih-Chan Yen, Jhubei (TW); Chih-Shih Yu, Hsinchu (TW)

(73) Assignee: Alpha Imaging Technology Corp., Hsinchu County (TW)

( * ) Notice: Subject to any disclaimer, the term of this patent is extended or adjusted under 35 U.S.C. 154(b) by 530 days.

(21) Appl. No.: 11/379,668

(22) Filed: Apr. 21, 2006

(65) Prior Publication Data

US 2006/0238624 A1    Oct. 26, 2006

(30) Foreign Application Priority Data

Apr. 22, 2005    (TW) ............................. 94113021 A

(51) Int. Cl.
*H04N 5/228*    (2006.01)
*H04N 5/222*    (2006.01)
*H04N 5/225*    (2006.01)
*H04M 1/00*    (2006.01)
*G06K 9/22*    (2006.01)

(52) U.S. Cl. .............................. 348/222.1; 348/333.01; 348/376; 455/556.1; 382/313

(58) Field of Classification Search ............ 348/207.99, 348/222.1, 333.01, 333.05, 333.11, 333.12, 348/373–376; 382/162–167, 313; 455/556.1
See application file for complete search history.

(56) References Cited

U.S. PATENT DOCUMENTS

| 6,124,945 | A | * | 9/2000 | Ishihara et al. ................ 358/1.9 |
| 7,394,487 | B2 | * | 7/2008 | Kaji ......................... 348/222.1 |
| 2004/0263663 | A1 | * | 12/2004 | Lee et al. ................ 348/333.11 |
| 2006/0250356 | A1 | * | 11/2006 | Sawamura ................... 345/156 |

* cited by examiner

*Primary Examiner*—David L Ometz
*Assistant Examiner*—Richard M Bemben
(74) *Attorney, Agent, or Firm*—Thomas, Kaden, Horstemeyer & Risley

(57) ABSTRACT

An apparatus for acquiring an image and a method therefor. The apparatus is electrically connected to an image sensor for acquiring an acquired image and outputting an original image signal. The apparatus includes an image processor, a data reduction unit and a buffer. The image processor generates a first image signal according to the original image signal. The data reduction unit reduces a data amount of the first image signal to generate a second image signal. The buffer stores the second image signal.

13 Claims, 3 Drawing Sheets

APPARATUS FOR ACQUIRING IMAGE AND METHOD THEREFOR

This application claims the benefit of Taiwan application Ser. No. 94113021, filed Apr. 22, 2005, the subject matter of which is incorporated herein by reference.

BACKGROUND OF THE INVENTION

1. Field of the Invention

The invention relates in general to an image apparatus, and more particularly to an image acquiring apparatus and an image acquiring method.

2. Description of the Related Art

FIG. 1 is a block diagram showing a conventional image acquiring apparatus. Referring to FIG. 1, an image acquiring apparatus 100 is electrically connected to an image sensor 120, which outputs an original image signal S1 to the image acquiring apparatus 100 for processing according to an acquired image. The image acquiring apparatus 100 includes an image processor 111, a buffer 112, a compression unit 113 and a conversion unit 114. The image processor 111 receives the original image signal S1 and then outputs a YUV image signal S21 or a RGB image signal S22 to the buffer 112. The buffer 112 stores the RGB image signal S22 or the YUV image signal S21, and outputs a RGB image signal S33 according to the RGB image signal S22 or outputs a YUV image signal S31 according to the YUV image signal S21. The conversion unit 114 receives the YUV image signal S31, and then converts the YUV image signal S31 in format and outputs a RGB image signal S32. A display unit 130 receives the RGB image signal S32 or the RGB image signal S33 and displays a frame. The compression unit 113 performs data compression and de-compression operations.

However, the image acquiring apparatus is used in, for example, a digital camera, a mobile telephone or a personal digital assistant (PDA). The above-mentioned mobile products are getting lower and lower in costs and smaller and smaller in sizes. If the trends in the market cannot be caught up with such that the feature of the image acquiring apparatus meets the mainstream of the low cost and the small size, the competition ability of this image acquiring apparatus is deteriorated, and the product will be gradually superannuated.

SUMMARY OF THE INVENTION

It is therefore an object of the invention to provide an image acquiring apparatus having a reduced buffer size and a reduced buffer capacity such that the cost and the dimension of the image acquiring apparatus are reduced and the mainstream of the market may be caught up with, and an image acquiring method therefor.

The invention achieves the above-identified object by providing an image acquiring apparatus disposed in a mobile telephone. The apparatus is electrically connected to an image sensor. The image sensor acquires an acquired image and outputs an original image signal. The image acquiring apparatus includes an image processor, a data reduction unit and a buffer. The image processor generates a first image signal according to the original image signal. The data reduction unit reduces a data amount of the first image signal to generate a second image signal. The buffer stores the second image signal.

The invention also achieves the above-identified object by providing an image acquiring method used in an image acquiring apparatus disposed in a mobile telephone. The image acquiring apparatus is electrically connected to an image sensor. The image acquiring apparatus includes an image processor, a data reduction unit and a buffer. First, the image sensor acquires an acquired image and outputs an original image signal. Next, the image processor generates a first image signal according to the original image signal. Thereafter, the data reduction unit reduces a data amount of the first image signal and then generates a second image signal. Finally, the second image signal is stored in the buffer.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
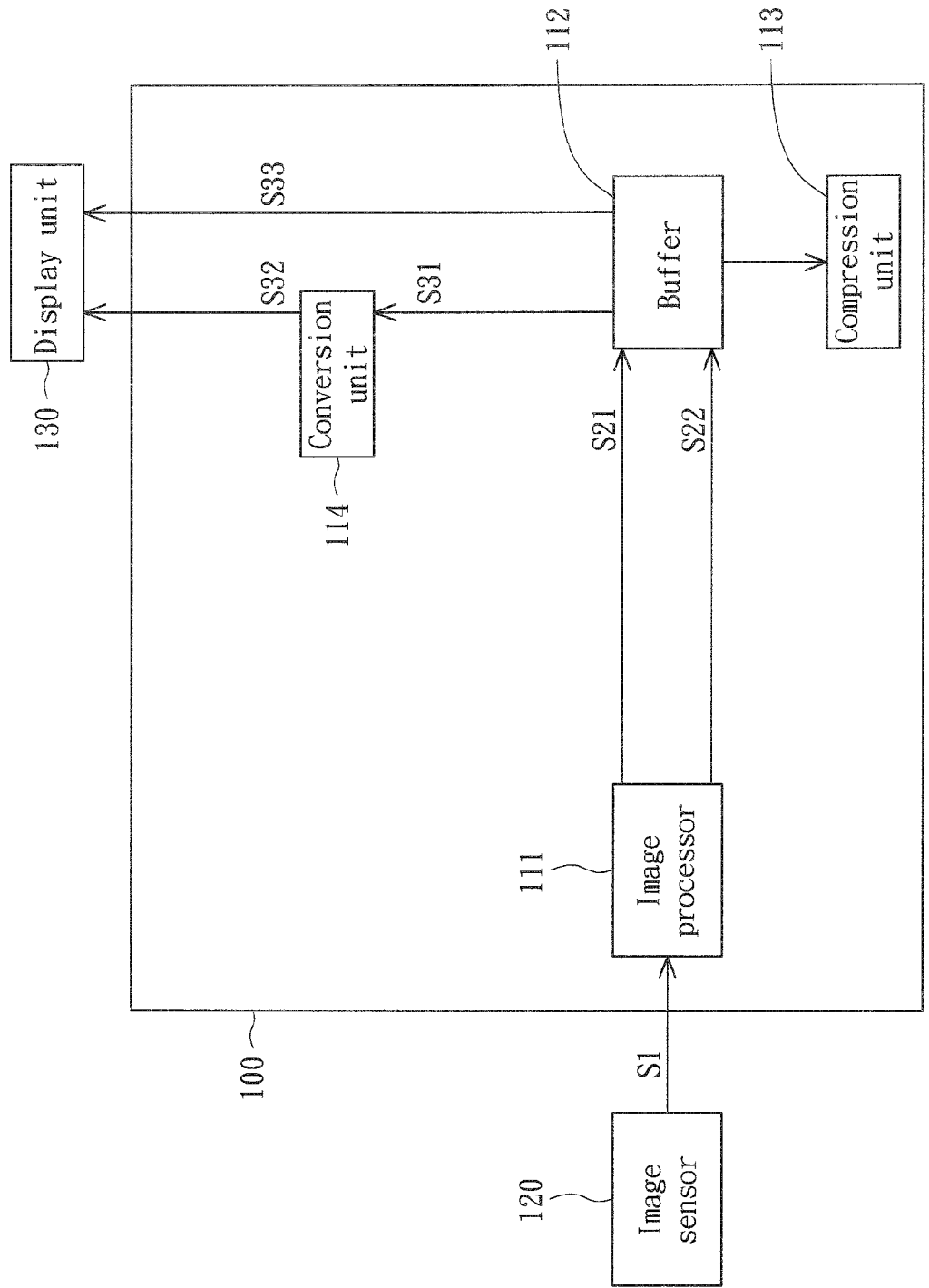
FIG. 1 is a block diagram showing a conventional image acquiring apparatus.
Figure 2:
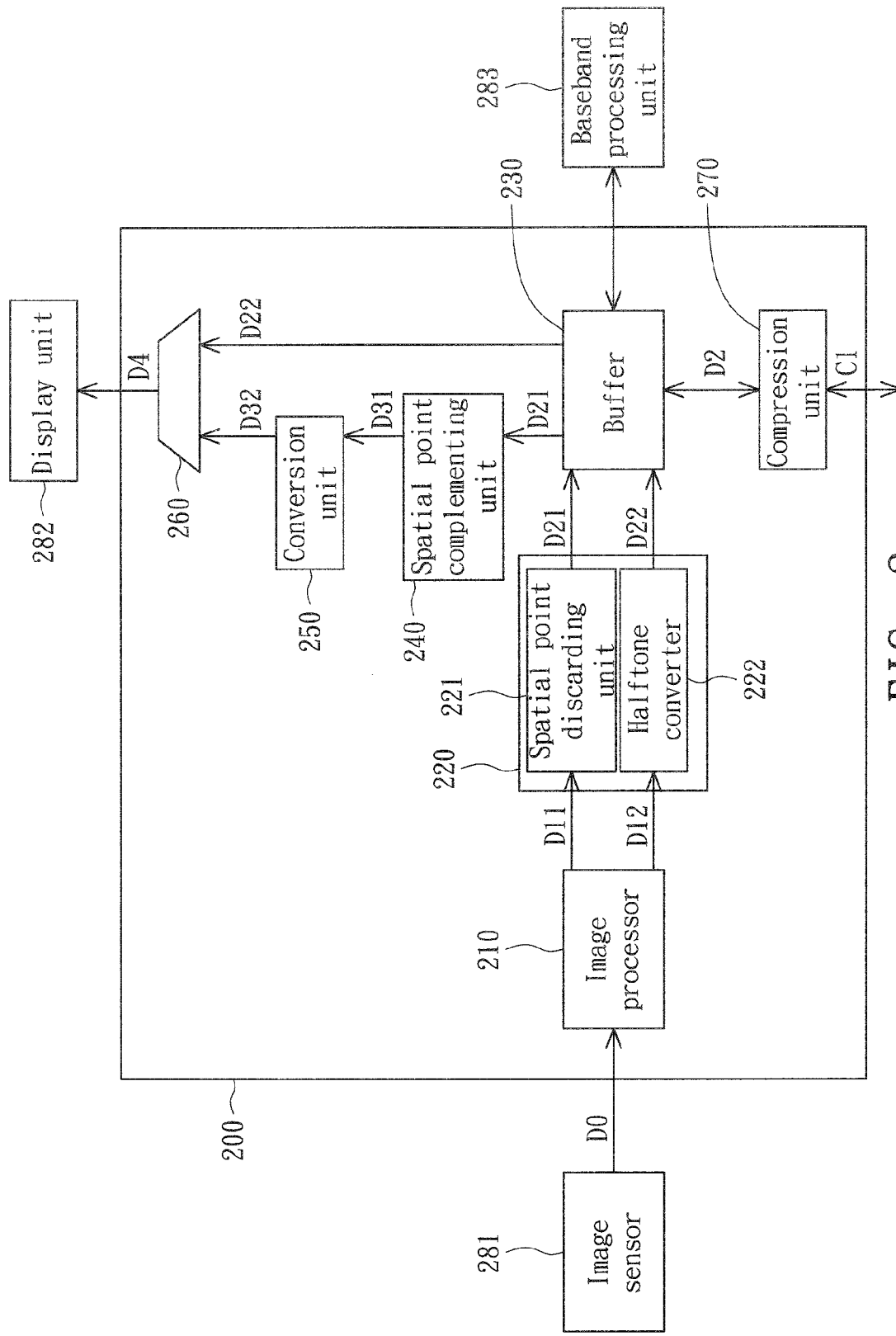
FIG. 2 is a block diagram showing an image acquiring apparatus according to a preferred embodiment of the invention.

FIG. 2 is a block diagram showing an image acquiring apparatus according to a preferred embodiment of the invention. As shown in FIG. 2, an image acquiring apparatus 200 is disposed in a mobile telephone. The image acquiring apparatus 200 is electrically connected to an image sensor 281 for acquiring an acquired image and outputting an original image signal D0 to the image acquiring apparatus 200. The image acquiring apparatus 200 includes an image processor 210, a data reduction unit 220, a buffer 230, a compression unit 270, a spatial point complementing unit 240, a conversion unit 250 and a multiplexer 260.

The image processor 210 generates an image signal D1, which includes a YUV image signal D11 and a RGB image signal D12, according to the image signal D0. The data reduction unit 220 reduces a data amount of the image signal D1 to generate an image signal D2. The image signal D2 includes a YUV image signal D21 and a RGB image signal D22. The buffer 230 stores the image signal D2.

The compression unit 270 is electrically connected to the buffer 230 and performs a compression or de-compression operation. For example, the compression unit 270 compresses the image signal D2 stored in the buffer 230 to generate a compressed signal C1 and then outputs the compressed signal C1 to an external memory (now shown). Alternatively, the compression unit 270 reads the compressed signal C1 from the external memory, de-compresses the compressed signal C1 and stores the decompressed result to the buffer 230. The image acquiring apparatus 200 is electrically connected to a display unit 282 and enables the display unit 282 to display a frame according to the YUV image signal D21 or the RGB image signal D22.

The data reduction unit 220 including a halftone converter 222 and a spatial point discarding unit 221 performs data reduction operations according to the YUV or RGB image signal. The procedures for processing the YUV or RGB image signal will be described in the following.

If the image processor 210 generates the RGB image signal D12, the image processor 210 de-mosaics the image signal D1 to generate the RGB image signal D22 using a de-mosaicking apparatus thereof. The image acquiring apparatus 200 enables the display unit 282 to display a frame according to the RGB image signal D22 stored in the buffer 230.

If the image processor 210 generates the RGB image signal D12, the data reduction unit 220 performs a data reduction operation using the halftone converter 222. The halftone converter 222 reduces the data amount of the RGB image signal D12 to generate the RGB image signal D22 by way of halftone conversion. The halftone conversion method is made by, for example, disposing pixels of the RGB image signal D12 in an arbitrary or specific manner such that a middle level of color gradient is reached, and the RGB image signal D12 with the data amount of 24 bits is reduced to generate the RGB image signal D22 with the data amount of 16 bits.

If the image processor 210 generates the YUV image signal D11, the data reduction unit 220 performs the data reduction operation using the spatial point discarding unit 221. The spatial point discarding unit 221 generates the YUV image signal D21 according to the YUV image signal D11 by way of spatial point discarding. The spatial point discarding method is made by, for example, discarding a pixel every two pixels according to the U and V signals in the YUV image signal D11. For example, if one of the pixels has the value of (Y1, U1, V1), and the following pixels have the values of (Y2, U2, V2), (Y3, U3, V3) and (Y4, U4, V4), the pixels have the values of (Y1, U1), (Y2, V1), (Y3, U3) and (Y4, V3) after the spatial point discarding procedure.

Thereafter, the spatial point complementing unit 240 receives the YUV image signal D21 from the buffer 230, performs the spatial point complementing procedure according to the YUV image signal D21, and then outputs a point complementing image signal D31. The spatial point complementing procedure is performed in correspondence with the above spatial point discarding procedure. The conversion unit 250 outputs a converted image signal D32 according to the point complementing image signal D31. The image acquiring apparatus 200 enables the display unit 282 to display a frame according to the converted image signal D32. The converted image signal D32 is a RGB image signal.

The multiplexer 260 receives the RGB image signal D22 and the converted image signal D32, selects the RGB image signal D22 or the converted image signal D32 as a display signal D4, and outputs the display signal D4 to the display unit 282 for displaying the frame.

The buffer 230 is electrically connected to a baseband processing unit 283, which performs a communicating and processing operation. The image acquiring apparatus 200 also transfers image data to the baseband processing unit 283, or receives the image data from the baseband processing unit 283.

Figure 3:
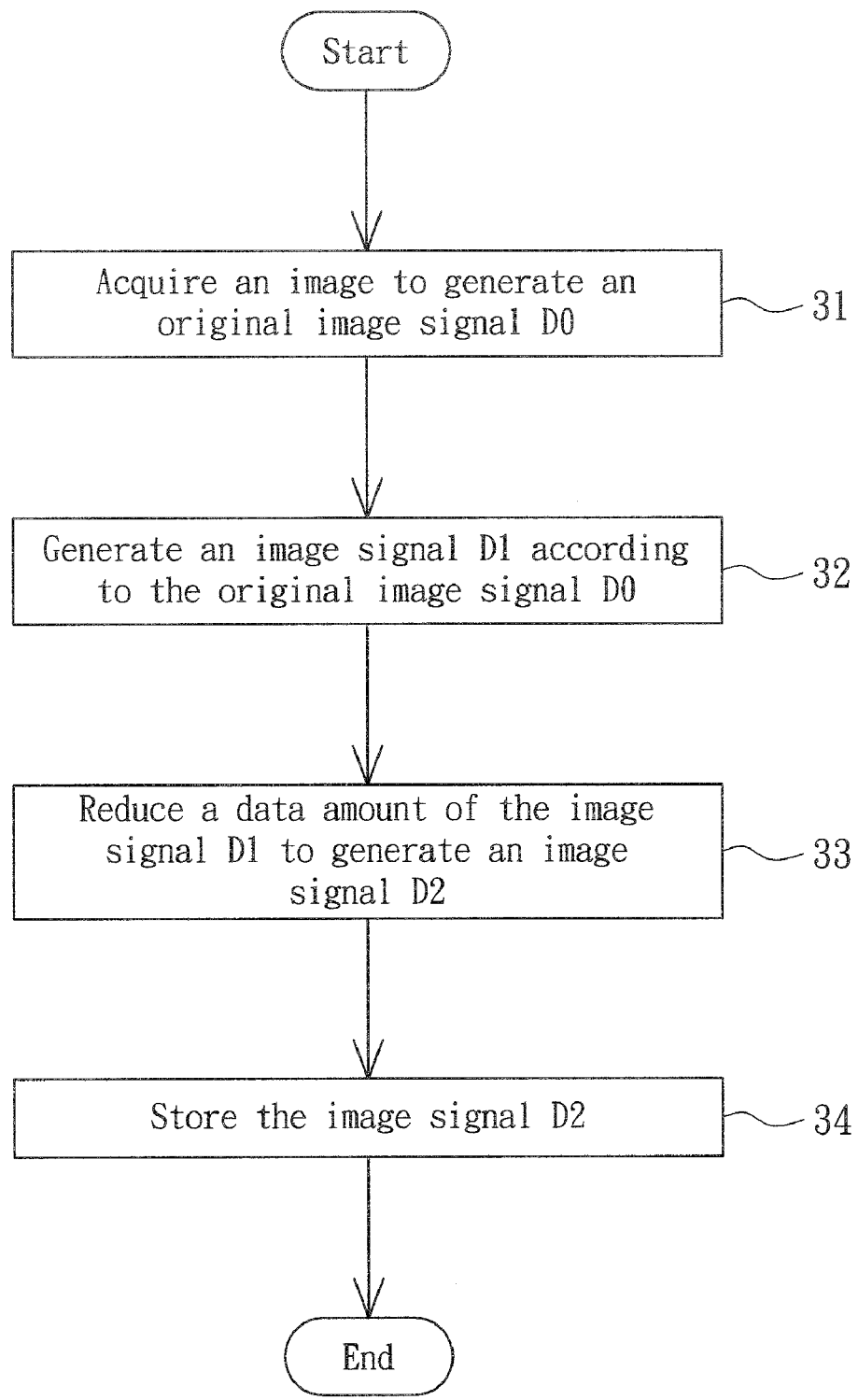
FIG. 3 is a flow chart showing an image acquiring method according to a preferred embodiment of the invention.

FIG. 3 is a flow chart showing an image acquiring method according to a preferred embodiment of the invention. First, the image sensor 281 acquires an image and outputs the original image signal D0, as shown in step 31. Next, the image processor 210 generates the image signal D1 according to the original image signal D0, as shown in step 32. Thereafter, the data reduction unit 220 reduces the data amount of the image signal D1 and then generates the image signal D2, as shown in step 33. Finally, the image signal D2 is stored in the buffer 230, as shown in step 34.

In step 33, the data amount of the RGB image signal D12 is reduced to generate the RGB image signal D12 by way of halftone conversion, and the data amount of the YUV image signal D11 is reduced to generate the YUV image signal D21 by way of spatial point discarding.

In the image acquiring apparatus 200, the YUV image signal or the RGB image signal may be used according to the application of the image acquiring apparatus 200, or the YUV and RGB image signals may be used simultaneously. However, no matter which one of the YUV image signal and the RGB image signal is used in the image acquiring apparatus 200, the size of the buffer may be reduced to one third that of the original buffer.

The image acquiring apparatus and method according to the embodiments of the invention reduce the data amount of the acquired image data such that the capacity of the buffer for storing the image may be reduced. Because the buffer occupies a relative large size in the image acquiring apparatus, the designs of reducing the buffer size and the capacity also reduce the cost and the size of the image acquiring apparatus, and the market mainstream may be caught up with.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image acquiring apparatus disposed in a mobile telephone and electrically connected to an image sensor for acquiring an acquired image and outputting an original image signal, the apparatus comprising:
    an image processor for generating a first image signal according to the original image signal, wherein the first image signal comprises a first RGB image signal and a first YUV image signal;
    a data reduction unit for respectively reducing a data amount of the first RGB image signal and the first YUV image signal to generate a second RGB image signal and a second YUV image signal; and
    a buffer for storing the second RGB image signal and the second YUV image signal;
    wherein the image acquiring apparatus selectively outputs the second RGB image signal and a third RGB image signal converted from the second YUV image signal to a display unit;
    wherein the data reduction unit comprises a spatial point discarding unit for generating the second YUV image signal by way of spatial point discarding according to the first YUV image signal.

2. The apparatus according to claim 1, further comprising a compression unit, which is electrically connected to the buffer, for compressing or decompressing data.

3. The apparatus according to claim 1, wherein the data reduction unit comprises a halftone converter, which reduces a data amount of the first RGB image signal and outputs the second RGB image signal to the buffer by way of halftone conversion.

4. The apparatus according to claim 3, wherein the image processor includes a de-mosaicking apparatus for de-mosaicking the original image signal to generate the first RGB image signal.

5. The apparatus according to claim 3, wherein the image acquiring apparatus enables the display unit to display a frame according to the second RGB image signal.

6. The apparatus according to claim 1, further comprising a multiplexer, wherein the multiplexer receives the second RGB image signal and receives the third RGB image signal from the buffer, selects one of the second RGB image signal and the third RGB image signal as a display signal according to a control signal, and outputs the display signal to the display unit for displaying the frame.

7. The apparatus according to claim 1, wherein the buffer is electrically connected to a baseband processing unit for performing a communicating and processing operation.

8. An image acquiring method used in an image acquiring apparatus disposed in a mobile telephone, the image acquiring apparatus being electrically connected to an image sensor and comprising an image processor, a data reduction unit and a buffer, the method comprising the steps of:

enabling the image sensor to acquire an acquired image and output an original image signal;

enabling the image processor to generate a first image signal according to the original image signal, wherein the first image signal comprises a first RGB image signal and a first YUV image signal;

enabling the data reduction unit to respectively reduce a data amount of the first RGB image signal and the first YUV image signal and then to generate a second RGB image signal and a second YUV image signal;

storing the second RGB image signal and the second YUV image signal in the buffer; and selectively outputting the second RGB image signal and a third RGB image signal converted from the second YUV image signal to a display unit;

wherein the second YUV image signal is generated by way of spatial point discarding in the step of reducing the data amount of the first RGB image signal and the first YUV image signal.

9. The method according to claim 8, wherein the data amount of the first RGB image signal is reduced, by way of halftone conversion, to generate the second RGB image signal in the step of reducing the data amount of the first RGB image signal and the first YUV image signal.

10. The method according to claim 9, wherein the step of generating the first image signal comprises a de-mosaicking step for de-mosaicking the original image signal to generate the first RGB image signal.

11. An image acquiring method used in an image acquiring apparatus disposed in a mobile telephone, the image acquiring apparatus being electrically connected to an image sensor, the method comprising the steps of:

acquiring an acquired image and outputting an original image signal;

generating a first image signal according to the original image signal, wherein the first image signal comprises a first RGB image signal and a first YUV image signal;

respectively reducing a data amount of the first RGB image signal and the first YUV image signal and then generating a second RGB image signal and a second YUV image signal;

storing the second RGB image signal and the second YUV image signal; and selectively outputting the second RGB image signal and a third RGB image signal converted from the second YUV image signal to a display unit;

wherein the second YUV image signal is generated by way of spatial point discarding in the step of reducing the data amount of the first RGB image signal and the first YUV image signal.

12. The method according to claim 11, wherein the data amount of the first RGB image signal is reduced, by way of halftone conversion, to generate the second RGB image signal in the step of reducing the data amount of the first RGB image signal and the first YUV image signal.

13. The method according to claim 12, wherein the step of generating the first image signal comprises a de-mosaicking step for de-mosaicking the original image signal to generate the first RGB image signal.

* * * * *